(12) United States Patent
Zhang

(10) Patent No.: US 8,504,120 B2
(45) Date of Patent: Aug. 6, 2013

(54) TECHNIQUES FOR CONTROLLING A RADIO PROCESSOR IN A MOBILE COMPUTING DEVICE

(75) Inventor: Haining Zhang, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 569 days.

(21) Appl. No.: 11/849,080

(22) Filed: Aug. 31, 2007

(65) Prior Publication Data
US 2009/0061781 A1    Mar. 5, 2009

(51) Int. Cl.
*H04M 3/00* (2006.01)
*H04B 7/15* (2006.01)
*H04J 3/24* (2006.01)

(52) U.S. Cl.
USPC ............... 455/574; 455/556.1; 455/556.2; 455/418; 455/422.1; 455/566; 455/567

(58) Field of Classification Search
USPC ............ 455/574, 556.1, 556.2, 418, 422.1, 455/566, 567
See application file for complete search history.

(56) References Cited

U.S. PATENT DOCUMENTS

| | | | |
|---|---|---|---|
| 6,928,300 B1 * | 8/2005 | Skinner et al. | 455/556.2 |
| 7,490,763 B2 * | 2/2009 | Keohane et al. | 235/382 |
| 7,532,105 B2 * | 5/2009 | Cho et al. | 340/309.16 |
| 2003/0203714 A1 | 10/2003 | Videtich et al. | |
| 2005/0186977 A1 * | 8/2005 | Chiu et al. | 455/466 |
| 2006/0056322 A1 * | 3/2006 | Simpson et al. | 370/278 |
| 2006/0059521 A1 | 3/2006 | Lee et al. | |
| 2006/0077055 A1 * | 4/2006 | Basir | 340/539.13 |
| 2007/0036035 A1 | 2/2007 | Cho et al. | |
| 2008/0168160 A1 * | 7/2008 | Tan et al. | 709/223 |
| 2008/0227067 A1 * | 9/2008 | Seymour | 434/238 |
| 2008/0244289 A1 * | 10/2008 | LeProwse et al. | 713/320 |
| 2009/0036148 A1 * | 2/2009 | Yach | 455/457 |
| 2009/0070175 A1 * | 3/2009 | Bauqhman et al. | 705/8 |
| 2009/0150194 A1 * | 6/2009 | Keohane et al. | 705/5 |
| 2009/0247146 A1 * | 10/2009 | Wesby | 455/419 |
| 2010/0267377 A1 * | 10/2010 | Chiu et al. | 455/418 |
| 2011/0077860 A1 * | 3/2011 | Coughlin et al. | 701/204 |
| 2011/0130958 A1 * | 6/2011 | Stahl et al. | 701/201 |

FOREIGN PATENT DOCUMENTS

| KR | 1020020085746 A | 11/2002 |
|---|---|---|
| WO | 2009032753 A1 | 3/2009 |

OTHER PUBLICATIONS

International Search Report and Written Opinion, International Application No. PCT/US2008/074631, Jan. 30, 2009, pp. 1-9.

* cited by examiner

*Primary Examiner* — Bobbak Safaipour

(57) ABSTRACT

Techniques for controlling a radio processor for a mobile computing device are described. An apparatus may comprise a mobile computing device to support cellular voice communication, wireless data communication and computing capabilities, the mobile computing device including an applications processor coupled to a radio processor. The applications processor may include a radio management module to manage operations for the radio processor, the radio management module having a radio control module arranged to enable and disable the radio processor in accordance with a radio control schedule. Other embodiments are described and claimed.

15 Claims, 4 Drawing Sheets

RADIO CONTROL PREFERENCES

| | |
|---|---|
| Name: | Home Schedule — 204-1 |
| Event: | Low Power Mode — 204-2 |
| Location: | Home — 204-3 |
| Starts: | 8/20/07 11:00 PM — 204-4 |
| Ends: | 9/20/07 08:00 AM — 204-5 |
| Occurs: | Sat - Sun — 204-6 |
| Reminder: | 15 minutes — 204-7 |

SET A RADIO TIMER FOR A SCHEDULE START TIME BASED ON A SCHEDULE START PARAMETER FROM A RADIO CONTROL SCHEDULE
302

RECEIVE NOTIFICATION THAT THE RADIO TIMER IS AT THE SCHEDULE START TIME
304

SEND A DISABLE RADIO CONTROL COMMAND TO DISABLE A RADIO PROCESSOR FOR A MOBILE COMPUTING DEVICE SUPPORTING CELLULAR VOICE COMMUNICATION AND WIRELESS DATA COMMUNICATION TO REDUCE POWER CONSUMPTION OF A BATTERY
306

FIG. 3

TECHNIQUES FOR CONTROLLING A RADIO PROCESSOR IN A MOBILE COMPUTING DEVICE

BACKGROUND

A mobile computing device such as a combination handheld computer and mobile telephone or smart phone generally may provide voice and data communications functionality, as well as computing and processing capabilities. For example, a mobile computing device may support cellular communication over cellular network such as a Code Division Multiple Access (CDMA) network as well as Evolution Data Optimized (EVDO) data communication over a wireless radio channel. A design consideration for mobile computing devices having such robust functionality, however, is managing power consumption by the device. Demands for longer battery life and smaller form factors derived from smaller battery sizes are important considerations for mobile computing devices. Consequently, there exists a substantial need for techniques to improve power consumption for mobile computing devices.

BRIEF DESCRIPTION OF THE DRAWINGS

FIG. 2 illustrates one embodiment of a graphics user interface view.

FIG. 3 illustrates one embodiment of a logic flow.

DETAILED DESCRIPTION

Figure 1:
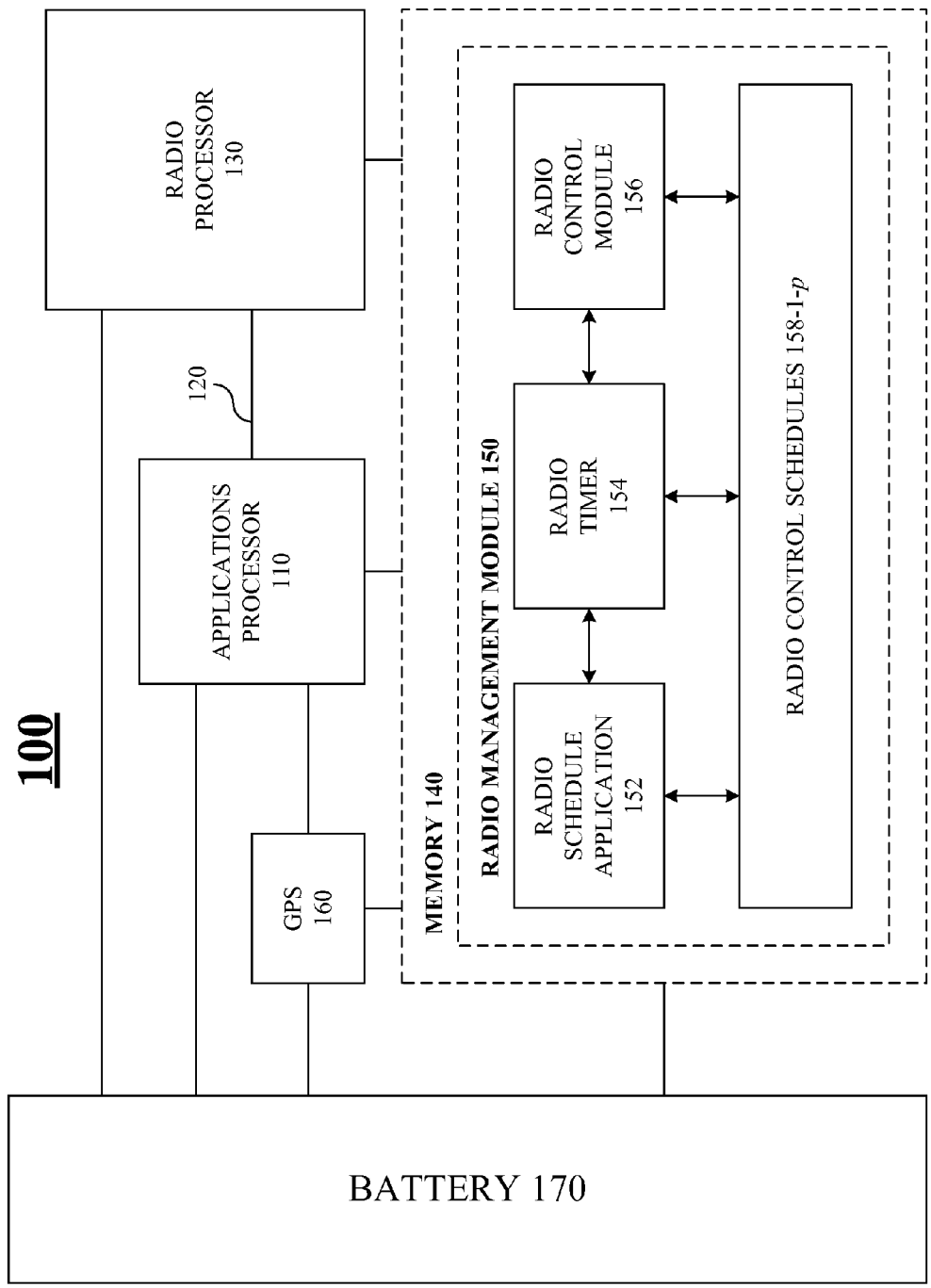
FIG. 1 illustrates one embodiment of a first mobile computing device.

Various embodiments may be generally directed to a mobile computing device arranged to support various computing and communications capabilities. Some embodiments may be particularly directed to a mobile computing device having a dual-processor computing architecture to provide the computing and communications capabilities. In one embodiment, for example, a mobile computing device may implement an applications processor and a radio processor. The applications processor may provide computing capabilities for the mobile computing device, such as executing application programs and system programs for the mobile computing device. The radio processor may provide communications capabilities for the mobile computing device, such as supporting cellular voice communication and wireless data communication.

The use of a dual-processor computing architecture for a mobile computing device provides several advantages, including increasing the speed and functionality offered by a mobile computing device. For example, an operator may execute various applications to process or manage data while simultaneously engaging in voice or data communications, without a substantially degradation in performance or increased load on either processor. One disadvantage of a dual-processor computing architecture, however, is the increase in the rate of power consumption from the portable power supply, such as a battery. This effectively decreases an amount of time an operator may use a mobile computing device away from a tethered or wired power supply, or alternatively, causes an increase in the size of the portable power supply to provide the desired time of mobile operation.

To solve these and other problems, the various embodiments may comprise a mobile computing device with a dual-processor computing architecture, with an applications processor to include or implement a radio management module to control operations for a radio processor. The radio management module may include a radio control module arranged to enable and disable the radio processor in accordance with a radio control schedule. The radio control schedule may include various radio control preferences as defined by an operator or from default settings. For example, an operator may define a recurring event in the radio control schedule to disable the radio processor every night at 11:00 PM, and enable the radio processor every morning at 8:00 AM. The radio control module may be coupled to a radio timer, and sends a disable radio time command to the applications processor at 11:00 PM. The applications processor in turn sends a disable radio time signal to the radio processor to disable the radio processor. Similarly, the radio control module may send an enable radio time command to the applications processor at 8:00 AM, and the applications processor sends an enable radio time signal to the radio processor to enable the radio processor. Consequently, the radio control module may automatically enable and disable the radio processor at certain dates and/or times as defined in the radio control schedule and as programmed by an operator or user. Accordingly, the amount of power consumed by the radio processor for a given time period may be reduced, thereby allowing longer battery life or a smaller form factor for a given battery.

FIG. 1 illustrates one embodiment of a mobile computing device 100. The mobile computing device 100 may be configured to support or provide cellular voice communication, wireless data communication and computing capabilities. The mobile computing device 100 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 100 implemented as a smart phone by way of example, it may be appreciated that the embodiments are not limited in this context. For example, the mobile computing device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

In the illustrated embodiment shown in FIG. 1, the mobile computing device 100 may include an applications processor 110 and a radio processor 130, with the processors 110, 130 connected or coupled by a signal line 120. The mobile computing device 100 may further include a memory unit 140. The memory unit 140 may store or implement a radio management module 150. The radio management module 150 may include a radio schedule application 152, a radio timer 154, a radio control module 156, and one or more radio control schedules 158-1-*p*. The mobile computing device 100 may also include a location system or component, such as a global positioning system (GPS) 160. The applications processor 110, the radio processor 130, the memory 140 and the GPS 160 may all be coupled to a portable or self-contained power supply, such as a battery 170. It may be appreciated that the illustrated embodiment of the mobile computing device 100 as shown in FIG. 1 includes a limited number of elements for purposes of clarity and not limitation. A more detailed block diagram for the mobile computing device 100 may be described with reference to FIG. 4.

The mobile computing device 100 may comprise or implement a radio management module 150. The radio management module 150 may comprise, for example, hardware and/or software such as radio management control logic (e.g., instructions, data, and/or code) to be executed by a logic device (e.g., host or applications processor 110). The logic may be stored internally or externally to the logic device on one or more types of computer-readable storage media. In one or more embodiments, the radio management module 150 may be implemented as one or more radio management application programming interface (API) commands on the applications processor 110. In some cases, however, the radio management module 150 may be implemented or directly coupled to the radio processor 130. This may be advantageous, for example, when the mobile computing device 100 utilizes only a single processor. In this case, the remote management module 150 may be implemented on a different power plane than the processor, to allow the remote management module 150 to enable and disable the single processor. The embodiments are not limited in this context.

When enabled, the radio management module 150 may be arranged to automatically and/or selectively manage some or all of the radio operations for the radio processor 130. For example, the radio schedule application 152 may be used to receive operator instructions to define or program a set of radio control preferences for a radio control schedule 158. The radio schedule application 152 may set or program the radio timer 154 using the radio control preferences defined for the radio control schedule 158. The radio control module 156 may receive timing information or a notification signal from the radio timer 154, and radio control preference information from the radio control schedule 158, and automatically enable and disable the radio processor 130 in accordance with the timing information and radio control preference information.

It can be appreciated that the automatic or selective management of the radio processor 130 may provide several advantageous over conventional techniques. For example, the radio management module 150 may reduce or eliminate the need for an operator of the mobile computing device 100 to manually enable and disable the radio processor 130. This may be desirable since an operator may forget, or find it inconvenient, to manually power down the radio processor 130 of the mobile computing device 100. In another example, the radio management module 150 may reduce power consumption from the battery 170 during those time periods when the radio processor 130 is disabled. This may extend an amount of time the battery 170 may provide power to the mobile computing device 100 when disconnected from a tethered power source, such as an Alternating Current (AC) power line. In addition to, or alternatively, this may allow a smaller form factor for the battery 170, thereby allowing a smaller form factor or different geometries for the mobile computing device 100.

In various embodiments, the radio management module 150 may include a radio schedule application 152. In one embodiment, for example, the radio scheduling application 152 may be arranged to receive operator instructions to define a set of radio control preferences for a radio control schedule 158-1-$p$, and generate the radio control schedule 158-1-$p$ in accordance with the operator instructions. The radio schedule application 152 may include various graphic user interface (GUI) views that allow an operator or user of the mobile computing device 100 to configure radio schedule preferences for automatically controlling the radio processor 130.

The radio schedule preferences may also include various default settings. The radio control schedules 158-1-$p$ may also include various preprogrammed radio control schedules included by the manufacturer of the mobile computing device 100 or third party vendors. The radio schedule application 152 may store the defined or selected radio schedule preferences in a radio control schedule 158-1-$p$.

In various embodiments, the radio management module 150 may include one or more radio timers 154. The radio timer 154 may comprise hardware or software based timers arranged to provide timing information to the radio control module 156. For example, the radio timer 154 may be set or programmed with various radio control time values corresponding to various radio control time parameters stored with the radio control schedule 158. For example, the radio schedule application 152 may retrieve a schedule start parameter from the radio control schedule 158, and program the radio timer 154 with the schedule start parameter to begin timing operations for disabling the radio processor 130. In another example, the radio schedule application 152 may retrieve a schedule end parameter from the radio control schedule 158, and program the radio timer 154 with the schedule end parameter to begin timing operations for enabling the radio processor 130. The radio timer 154 may notify the radio control module 156 when a current time matches the schedule start parameter or the schedule end parameter. If radio timer 154 is implemented as a count-down timer, then the radio timer 154 may notify the radio control module 156 when the defined time interval has expired.

In various embodiments, the radio management module 150 may include a radio control module 156. The radio control module 156 may be arranged to send commands to the application processor 110 to enable and disable the radio processor 130 in accordance with a radio control schedule 158. For example, the radio schedule application 152 may set the radio timer 154 for a schedule start time based on a schedule start parameter from the radio control schedule 158. The radio timer 154 may send timing information to the radio control module 156. For example, the timing information may include a notification indicating that the radio timer 154 is at the schedule start time. The radio control module 156 may receive the notification from the radio timer 154, and send a disable radio control command to the applications processor 110. The applications processor 110 may send a disable radio control signal to the radio processor 130 over the signal line 120 to disable the radio processor 130 for the mobile computing device 100. Similarly, the radio schedule application 152 may set the radio timer 154 for a schedule end time based on a schedule end parameter from the radio control schedule 158. The radio timer 154 may send timing information to the radio control module 156. For example, the timing information may include a notification indicating that the radio timer 154 is at the schedule end time. The radio control module 156 may receive the notification from the radio timer 154, and send an enable radio control command to the applications processor 110. The applications processor 110 may send an enable radio control signal to the radio processor 130 over the signal line 120 to enable the radio processor 130 for the mobile computing device 100.

The radio control module 156 may enable and disable the radio processor 130 using the signal line 120. The applications processor 110 and the radio processor 130 may be connected or coupled by the signal line 120. In one embodiment, for example, the signal line 120 may be used to implement a General Purpose Input/Output (GPIO) technique that is typically used in the embedded electronics field. The GPIO peripheral provides dedicated general-purpose pins that can be configured as either inputs or outputs. When configured as an output, an internal register may be written to in order to control the state driven on the output pin. When configured as an input, the state of the input may be detected by reading the state of an internal register. In this case, the applications processor 110 may write to an internal register to assert or drive different states on an output pin of the applications processor 110 to send signals to a corresponding input pin of the radio processor 130 via the signal line 120. The radio processor 130 may read an internal register to detect the current state of the input signal received by the input pin of the radio processor 130. The different states may enable or disable the radio processor 130. Additional signal lines other than the signal line 120 may be used when the radio processor 130 has more than two operating modes. Furthermore, other techniques may be used to allow the applications processor 110 to enable and disable the radio processor 130 as desired for a given implementation.

FIG. 2 illustrates one embodiment of a GUI view 200. The GUI view 200 may be an example of a GUI view generated by the radio schedule application 152 to allow an operator to define a set of radio control preferences needed to generate a radio control schedule 158-1-$p$ used to automatically control the radio processor 130. As shown in FIG. 2, the GUI view 200 may have various radio schedule parameter fields 202-1-$m$ to store associated radio schedule parameters 204-1-$n$. The radio schedule parameter fields 202-1-$m$ and the radio schedule parameters 204-1-$n$ may be stored in a radio control schedule 158-1-$p$. It may be appreciated that the radio schedule parameter fields 202-1-$m$ and the radio schedule parameters 204-1-$n$ described with reference to the GUI view 200 are by way of example and not limitation, and that other radio schedule parameter fields 202-1-$m$ and radio schedule parameters 204-1-$n$ may be implemented for a given set of design parameters and performance constraints for the mobile computing device 100.

In the illustrated embodiment shown in FIG. 2, the GUI view 200 may comprise a GUI view with various radio schedule parameter fields 202-1-$m$. For example, the radio schedule parameter fields 202-1-$m$ may include a schedule name field 202-1, a schedule event field 202-2, a schedule location field 202-3, a schedule start field 202-4, a schedule end field 202-5, a schedule occur field 202-6, and a schedule reminder field 202-7.

An operator may define or select various radio schedule parameters 204-1-$n$ for each of the corresponding radio schedule parameter fields 202-1-$m$. For example, the radio schedule parameters 204-1-$n$ may be presented to the operator as a list of possible candidate radio schedule parameters 204-1-$n$ for each radio schedule parameter field 202-1-$m$, and the operator may select one of the candidate radio schedule parameters 204-1-$n$ from the provided list for each radio schedule parameter field 202-1-$m$. Various exemplary candidate radio schedule parameter 204-1-$n$ selections may be shown in the GUI view 200.

In one embodiment, for example, a schedule name parameter 204-1 may be defined or selected for the schedule name field 202-1. The schedule name parameter 204-1 may allow an operator to define or select a name for the radio control schedule 158. An operator may define separate radio control schedules 158-1-$p$ for different purposes or environments. For example, an operator may define one radio control schedule 158-1 for use when at home, another radio control schedule 158-2 for use when at work, yet another radio control schedule 158-3 for when traveling, and so forth. The schedule name parameter 204-1 allows an operator to name different radio control schedules 158-1-$p$, and use the name to identify and load a particular radio control schedule 158-1-$p$. For example, assume that an operator defines or selects a set of radio schedule parameters 204-1-$n$ to include a "Home Schedule" for a schedule name parameter 204-1 corresponding to the schedule name field 202-1. The "Home Schedule" may comprise a name for a radio control schedule 158-1 that an operator desires to use when at their home or residence. Other radio control schedules may be defined, such as an "Office Schedule," a "Travel Schedule," a "Vacation Schedule," an "Airplane Schedule," a "Flight Schedule," and so forth. Each radio control schedule 158-1-$p$ may have different radio schedule parameters 204-1-$n$ defined for the radio schedule parameter fields 202-1-$m$ to fit different use scenarios.

In one embodiment, for example, a schedule event parameter 204-2 may be defined or selected for the schedule event field 202-2. The schedule event parameter 204-2 may indicate the various types of operating modes for the radio processor 130 when disabled. The mobile computing device 100 in general, and the radio processor 130 in particular, may have various operating modes that consume varying amounts of power from the battery 170. The schedule event parameter 204-2 may indicate a particular operating mode for the radio processor 130 to be placed in when disabled. As used herein, the terms "disable," "disabled," "disabling" or similar terms includes placing the radio processor 130 in various operating modes that reduce power consumed from the battery 170, as well as removing power completely from the radio processor 130.

In one embodiment, for example, the radio processor 130 may be placed in one of three operating modes, including a Level 0 or "Active" operating mode, a Level 1 or "Idle" operating mode, and a Level 2 or "Sleep" operating mode. The Level 0 or Active operating mode represents an operating mode where all the features of the radio processor 130 are enabled or activated. The Level 0 or Active operating mode typically draws the maximum amount of power from the battery 170 relative to the other operating modes. The Level 2 or Sleep operating mode represents an operating mode where none of the features of the radio processor 130 are enabled or activated, or stated another way, are disabled or deactivated. The Level 2 or Sleep operating mode typically draws the minimum amount of power from the battery 170 relative to the other operating modes. The Level 1 or Idle operating mode represents an operating mode having a corresponding power draw that is between Level 0 and Level 2. The Level 1 or Idle operating mode is where a sub-set of features of the radio processor 130 are enabled or activated. The Level 1 or Idle operating mode is typically when the radio processor 130 is placed into a Level 2 or Sleep operating mode, and the radio processor 130 is periodically or intermittently switched to a higher operating mode (e.g., Level 0 or Active operating mode) to scan a control channel for call indicators. Although only 3 levels of operating modes and corresponding power levels are described in this embodiment, it may be appreciated that any number of operating modes and corresponding power levels may be implemented for the mobile computing device 100. The particular operating modes and corresponding levels of power consumption implemented for the mobile computing device 100 may be defined by any number of different standards as desired for a given set of design parameters and performance constraints. The principles as described in the various embodiments may be applicable to any mobile computing device having at least two different operating modes with corresponding power requirements that draw two different levels of power. The embodiments are not limited in this context.

Referring again to the schedule event parameter 204-2, assume an operator defines or selects a "Low Power Mode" for a schedule event parameter 204-2 corresponding to the schedule event field 202-2. The "Low Power Mode" is an operating mode defined for use with Code Division Multiple Access (CDMA) communication devices, and is similar to the Level 2 or Sleep operating mode as previously described. Setting a "Low Power Mode" for the schedule event parameter 204-2 indicates that the operator would like the radio processor to be placed in a Level 2 or Sleep operating mode when disabled. When the mobile computing device 100 is implemented as a Global System For Mobile Communications (GSM) cellular telephone, then an operator might select a "Deep Sleep Mode" for a schedule event parameter 204-2. The "Deep Sleep Mode" is an operating mode defined for use with GSM communication devices, and is similar to the Level 2 or Sleep operating mode as previously described.

In one embodiment, for example, a schedule location parameter 204-3 may be defined or selected for the schedule event field 202-3. The schedule location parameter 204-3 may represent a location where the radio control schedule identified by the schedule name parameter 204-1 should be activated, enabled or implemented. For example, the radio management module 150 may be arranged to load and use a certain radio control schedule 158-1-$p$ based on a current location for the mobile computing device 100.

The mobile computing device 100 may include a location system to identify a location for the mobile computing device 100. The location system may implement any technique to approximate an instantaneous location for the mobile computing device 100. An example of a location system may include a GPS device or component, as represented by the GPS 160. Other location systems and techniques, however, may be used in lieu of the GPS 160. For example, various mobile positioning techniques may be used. Mobile positioning is a technique used by telecommunication companies to approximate a location for a mobile phone using the existing cellular infrastructure equipment, such as the base stations or node B systems. GSM localization is a form of mobile positioning that uses multilateration to determine the location of GSM mobile phones. Examples of GSM localization techniques may include Cell Identification, Enhanced Cell Identification, Time Difference of Arrival (TDOA), Time of Arrival (TOA), Angle of Arrival (AOA), Enhanced Observed Time Difference (E-OTD), Cell Broadcast, Assisted-GPS, and so forth.

In various embodiments, the radio management module 150 may use the location information from the GPS 160 to select and load a radio control schedule 158-1-$p$ based on a current location for the mobile computing device 100. The GPS 160 may provide location information to the radio management module 150. The radio schedule application 152 may receive the location information from the GPS 160, and load a radio control schedule 158-1-$p$ with a name corresponding to the schedule name parameter 204-1. The radio schedule application 152 may then program the radio timer 154 with the appropriate time parameters retrieved from the loaded radio control schedule 158.

In the example shown in the GUI view 200, assume an operator selects "Home" for a schedule location parameter 204-3 corresponding to the schedule location field 202-3. As the operator travels, the GPS 160 may periodically provide location information to the radio management module 150. The radio schedule application 152 may compare the location information received from the GPS 160 with a schedule table. The schedule table may include a list of schedule location parameters 204-3 and corresponding schedule name parameters 204-1. Whenever the current location information received from the GPS 160 matches a schedule location parameter 204-3 from the schedule table, then the radio schedule application 152 may load the radio control schedule 158-1-$p$ corresponding to the matched schedule name parameter 204-1. The radio control module 156 may use the loaded radio control schedule 158-1-$p$ until the current location information received from the GPS 160 indicates a different radio control schedule 158-1-$p$ (e.g., an "Office Schedule" radio control schedule 158-2) is to be used by the radio control module 156.

In another example, assume that a set of radio control preferences have been defined specifically for use when on an airplane or helicopter. Further assume that an operator names a radio control schedule with such radio control preferences with a "Flight Schedule," and selects the "Flight Schedule" as the schedule name parameter 204-1 of the schedule name field 202-1. Whenever the location information from the GPS 160 indicates a certain altitude or height, the radio schedule application 152 may load a radio control schedule 158-1-$p$ with a name corresponding to the schedule name parameter 204-1 of "Flight Schedule." The radio control module 156 may utilize the radio control schedule 158-1-$p$ to automatically control the operations of the radio processor 130. For example, the radio control module 156 may immediately disable the radio processor 130 while above a certain altitude or height, and enable the radio processor 130 when below a certain altitude or height. In some cases, the mobile computing device 100 may include a map application to provide map information to identify an altitude for ground level of a current location, such as an airport, and provide an absolute difference between the ground level and the current altitude to use as a trigger to enable and disable the radio processor 130. The embodiments are not limited in this context.

In one embodiment, for example, a schedule start parameter 204-4 and a schedule end parameter 204-5 may be defined or selected for the respective schedule start field 202-4 and the schedule end field 202-5. The schedule start parameter 204-4 may represent a date and/or time when the radio control module 156 is to disable the radio processor 130. The schedule end parameter 204-5 may represent a date and/or time when the radio control module 156 is to enable the radio processor 130. For example, assume an operator defines "Aug. 20, 2007 11:00 PM" for a schedule start parameter 204-4 corresponding to the schedule start field 202-4, and "Sep. 20, 2007 08:00 AM" for a schedule end parameter 204-5 corresponding to the schedule end field 202-5. In this case, the radio control module 156 may disable the radio processor 130 when the radio timer 154 indicates a time matching "11:00 PM," and enable the radio processor 130 when the radio timer 154 indicates a time matching "08:00 AM." The dates of "Aug. 20, 2007" and "Sep. 20, 2007" may be used to determine when the radio control module 156 is to start and stop using the radio control schedule 158-1-$p$, respectively. The schedule start parameter 204-4 and the schedule end parameter 204-5 may reflect any number of different time zones, such as Eastern Standard Time (EST) and Pacific Standard Time (PST), as well as different time standards or definitions, such as International Atomic Time (TAI), Coordinated Universal Time (UTC), and so forth.

In one embodiment, for example, a schedule occur parameter 204-6 may be defined or selected for the schedule occur field 202-6. The schedule occur parameter 204-6 may represent how often the time schedules indicated by the schedule start parameter 204-4 and the schedule end parameter 204-5 are to be repeated. For example, assume an operator defines "Sat-Sun" for a schedule occur parameter 204-6 corresponding to the schedule occur field 202-6. In this case, the 11:00 PM to 8:00 AM time schedule may be implemented every Saturday and Sunday occurring between the dates of Aug. 20, 2007 and Sep. 20, 2007. Such parameters may be set to reflect those days when an operator will likely be at home.

In one embodiment, for example, a schedule reminder parameter 204-7 may be defined or selected for the schedule occur field 202-7. The schedule reminder parameter 204-7 may represent whether to remind an operator that a given radio control schedule 158-1-*p* will be implemented by the radio management module 150, and if so, how long prior to implementing the radio control schedule 158-1-*p*. For example, assume an operator defines "15 minutes" for a schedule reminder parameter 204-7 corresponding to the schedule reminder field 202-7. In this case, the radio schedule application 152 will provide a reminder to the operator that a radio control schedule 158-1*p* corresponding to the name "Home Schedule" will be implemented starting on Aug. 20, 2007 at 11:00 PM, with the radio schedule application 152 to provide the reminder 15 minutes prior to 11:00 PM, namely at 10:45 PM.

In various embodiments, the radio management module 150 may be arranged to generate a prompt for an operator to manually enable or disable the radio processor based on a location. In some implementations, the user may be prompted to manually enable and/or disable the radio processor 130 when the mobile computing device 100 is in a certain location, such as boarding an airplane for travel. For example, the location information may be used as inputs to a map application to identify points of interest on a map, such as airports or helipads. Whenever, the GPS 160 generates location information that matches coordinates on a map corresponding to an airport, the radio management module 150 may either load a radio control schedule 158-1-*p* corresponding to the location (e.g., the "Flight Schedule" radio control schedule), or manually prompt the operator to disable the radio processor 130. Similarly, when the GPS 160 generates location information that matches coordinates on a map indicating that the mobile computing device 100 is leaving the airport, the radio management module 150 may either load a new radio control schedule 158-1-*p*, or manually prompt the operator to enable the radio processor 130.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 200 may be implemented by a logic device (e.g., processor) and/or logic (e.g., instructions, data, and/or code) to be executed by a logic device. For purposes of illustration, and not limitation, the logic flow 300 is described with reference to FIGS. 1 and 2.

The logic flow 300 may illustrate various operations for the mobile computing device 100 in general, and the radio management module 150 in particular. For example, the logic flow 300 may illustrate operations for the radio management module 150 to disable some or all of the operations for the radio processor 130. As shown in FIG. 3, the logic flow 300 may set a radio timer for a schedule start time based on a schedule start parameter from a radio control schedule at block 302. The logic flow 300 may receive notification that the radio timer is at the schedule start time at block 304. The logic flow 300 may send a disable radio control command to disable a radio processor for a mobile computing device supporting cellular voice communication and wireless data communication to reduce power consumption of a battery at block 306. The embodiments are not limited in this context.

In one embodiment, the logic flow 300 may set a radio timer for a schedule start time based on a schedule start parameter from a radio control schedule at block 302. For example, a schedule start parameter 204-4 may represent a date and/or time when the radio control module 156 is to disable the radio processor 130. The radio schedule application 152 may set or program the radio timer 154 with a schedule start parameter 204-4 corresponding to the schedule start field 202-4 from the radio control schedule 158-1-*p*. An example of a schedule start parameter 204-4 may include "Aug. 20, 2007 11:00 PM" as shown in the GUI view of FIG. 2.

In one embodiment, the logic flow 300 may receive notification that the radio timer is at the schedule start time at block 304. For example, the radio timer 154 may be arranged to compare a current time with the schedule start parameter 204-4, and output a notification signal when the current time matches the schedule start parameter 204-4. The radio control module 156 may receive the notification signal from the radio timer 154 indicating that the schedule start time has been reached.

In one embodiment, the logic flow 300 may send a disable radio control command to disable a radio processor for a mobile computing device supporting cellular voice communication and wireless data communication to reduce power consumption of a battery at block 306. For example, once the radio control module 156 receives the notification signal from the radio timer 154, the radio control module 156 may send a disable radio control command to the applications processor 110. The applications processor 110 may send or assert a disable radio control signal over the signal line 120 to the radio processor 130. The radio processor 130 may disable operations in response to the disable radio control signal.

Using operations similar to the operations performed by the blocks 302, 304 and 306 of the logic flow 300, the radio management module 150 may enable some or all of the operations for the radio processor 130. For example, the radio schedule application 152 of the radio management module 150 may set the radio timer 154 for a schedule end time based on a schedule end parameter 204-5 from the radio control schedule 158. The schedule end parameter 204-5 may represent a date and/or time when the radio control module 156 is to enable the radio processor 130. An example of a schedule end parameter 204-5 may include "Sep. 20, 2007 8:00 AM" as shown in the GUI view of FIG. 2. The radio timer 154 may output a notification signal indicating that the radio timer 154 is at the schedule end time. The radio control module 156 may receive the notification signal from the radio timer 154, and send an enable radio control command to the applications processor 110. The applications processor 110 may send or assert an enable radio control signal to enable the radio processor 130 via the signal line 120. The radio processor 130 may enable operations in response to the enable radio control signal.

Figure 4:
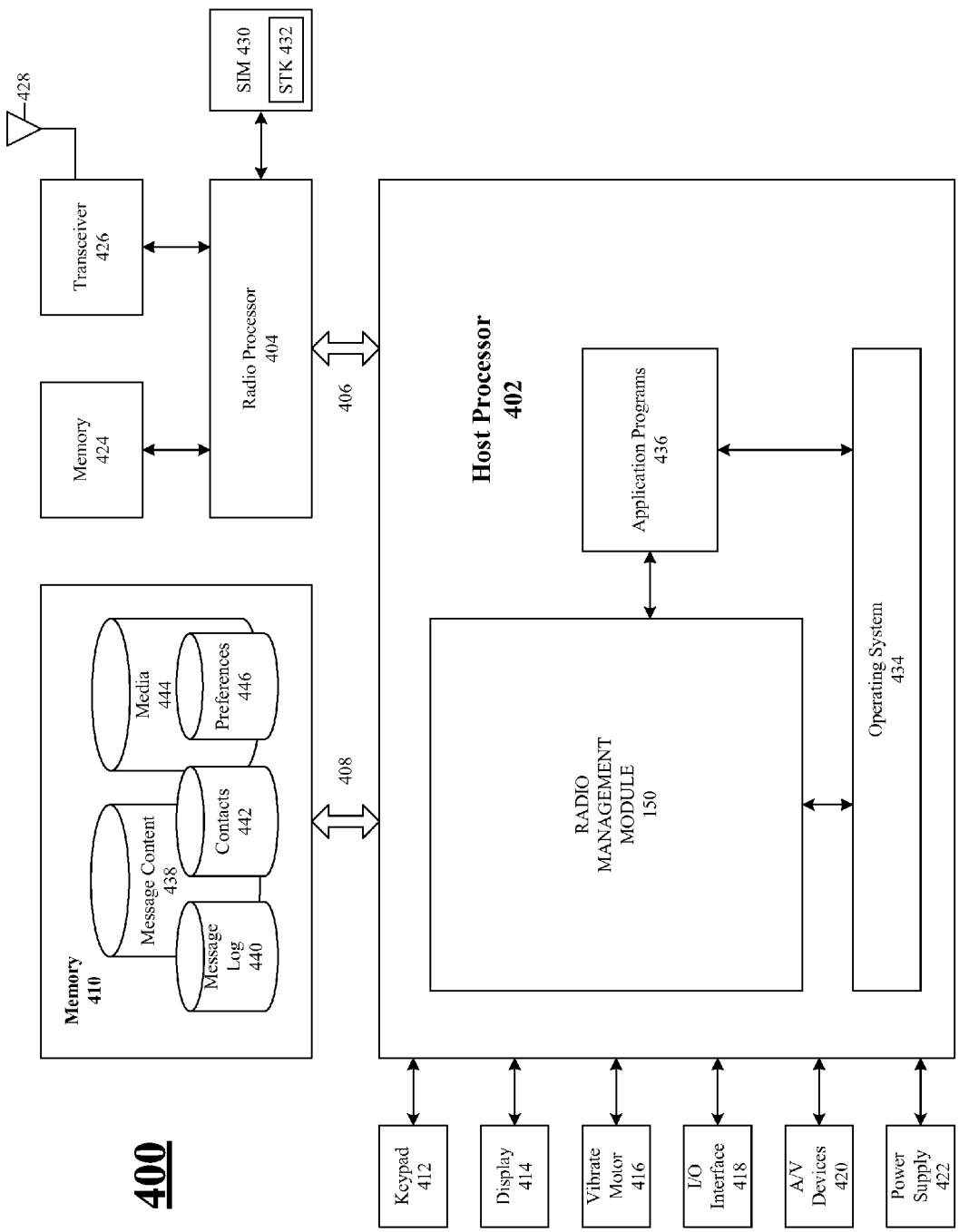
FIG. 4 illustrates one embodiment of a second mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The mobile computing device 400 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, the mobile computing device 400 may be arranged to provide mobile packet data communications functionality in accordance with different types of cellular radiotelephone systems. Examples of cellular radiotelephone systems offering mobile packet data communications services may include GSM with General Packet Radio Service (GPRS) systems (GSM/GPRS), CDMA/1xRTT systems, Enhanced Data Rates for Global Evolution (EDGE) systems, Evolution Data Optimized (EVDO) systems, Evolution For Data and Voice (EVDV) systems, High Speed Downlink Packet Access (HSDPA) systems, High Speed Uplink Packet Access (HSUPA), and so forth.

The mobile computing device 400 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 400 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

As shown in the embodiment of FIG. 4, the mobile computing device 400 may comprise a dual processor architecture including a host processor 402 and a radio processor 404. In various implementations, the host processor 402 and the radio processor 404 may be arranged to communicate with each other using interfaces 406 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 402 may be responsible for executing various software programs such as system programs and applications programs to provide computing and processing operations for the mobile computing device 400. The radio processor 404 may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or rewriteable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alpha-numeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the embodiments.

The invention claimed is:

1. An apparatus comprising:
   a mobile computing device to support cellular voice communication, wireless data communication and computing capabilities,
   the mobile computing device including an applications processor coupled to a radio processor, and a location system to identify and provide a geographic location for the mobile computing device,
   the applications processor to include a radio management module to manage operations for the radio processor, the radio management module having a radio schedule application and a radio control module, the radio control module arranged to enable and disable the radio processor in accordance with a radio control schedule, the radio control schedule to include a schedule event parameter to define a power mode for the radio processor when disabled, the power mode chosen from a first power mode or a second power mode, wherein the first power mode includes a first sub-set of features of the radio processor being disabled to achieve a first power draw and the second power mode includes a second sub-set of features of the radio processor being disabled to achieve a second power draw, the radio control schedule to further include a schedule location parameter to define a location to activate the radio control schedule;
   the radio processor to execute the communication functions of the mobile computing device; and
   the location system to provide the geographic location to the radio schedule application, the radio schedule application to compare the geographic location to a list of schedule location parameters, and when the geographic location matches the schedule location parameter the radio control module to use the radio control schedule corresponding to the matched schedule location parameter.

2. The apparatus of claim 1, the radio scheduling application to receive operator instructions to define the radio control schedule, and generate the radio control schedule in accordance with operator instructions.

3. The apparatus of claim 1, the radio management module to include a radio timer set to a defined time interval in accordance with the radio control schedule, the radio timer to notify the radio control module when the defined time interval has expired.

4. The apparatus of claim 1, the radio control module to send a disable radio control command to the applications processor, the applications processor to send a disable radio control signal to the radio processor to disable the radio processor.

5. The apparatus of claim 1, the radio control module to send an enable radio control command to the applications processor, the applications processor to send an enable radio control signal to the radio processor to enable the radio processor.

6. The apparatus of claim 1, the mobile computing device comprising a global positioning system to identify the geographic location for the mobile computing device, the radio management module to generate a prompt for an operator to manually enable or disable the radio processor based on the location.

7. A method comprising:
   setting a radio timer for a schedule start time based on a schedule start parameter from a radio control schedule, the radio control schedule to include a schedule event parameter to define a power mode for the radio processor when disabled, the power mode chosen from a first power mode or a second power mode, wherein the first power mode includes a first sub-set of features of the radio processor being disabled to achieve a first power draw and the second power mode includes a second sub-set of features of the radio processor being disabled to achieve a second power draw, the radio control schedule to further include a schedule location parameter to define a location to activate the radio control schedule;
   receiving notification that the radio timer is at the schedule start time;
   sending a disable radio control command to disable a radio processor for a mobile computing device, the radio processor executing cellular voice communication and wireless data communication functions for the mobile communication device, the disable radio command to reduce power consumption of a battery;
   receiving location information for the mobile computing device;
   comparing the location information with a list of schedule location parameters; and
   activating the radio control schedule when the location information matches the schedule location parameter.

8. The method of claim 7, comprising:
   receiving the disable radio control command by an applications processor; and
   sending a disable radio control signal from the applications processor to the radio processor.

9. The method of claim 7, comprising:
   setting the radio timer for a schedule end time based on a schedule end parameter from the radio control schedule;
   receiving notification that the radio timer is at the schedule end time; and
   sending an enable radio control command to enable the radio processor.

10. The method of claim 9, comprising:
    receiving the enable radio control command by an applications processor; and
    sending an enable radio control signal from the applications processor to the radio processor.

11. The method of claim 7, comprising:
    generating a graphics user interface view with radio control preferences;
    receiving selections for radio control preferences; and
    storing the radio control preferences in the radio control schedule.

12. A non-transitory computer-readable storage medium comprising instructions that when executed enable a computing system to:
    set a radio timer for a schedule start time based on a schedule start parameter from a radio control schedule, the radio control schedule to include a schedule event parameter to define a power mode for the radio processor when disabled, the power mode chosen from a first power mode or a second power mode, wherein the first power mode includes a first sub-set of features of the radio processor being disabled to achieve a first power draw and the second power mode includes a second sub-set of features of the radio processor being disabled to achieve a second power draw, the radio control schedule to further include a schedule location parameter to define a location to activate the radio control schedule;
    receive notification that the radio timer is at the schedule start time;
    send a disable radio control command to disable a radio processor for a mobile computing device, the radio processor executing cellular voice communication and wireless data communication functions for the mobile communication device, the disable radio command to reduce power consumption of a battery;

receive geographic location information for the mobile computing device;

compare the geographic location information with a list of schedule location parameters; and activate the radio control schedule when the geographic location information matches the schedule location parameter.

13. The non-transitory storage medium of claim 12, further comprising instructions that if executed enable a computing system to:

receive the disable radio control command by an applications processor; and send a disable radio control signal from the applications processor to the radio processor.

14. The non-transitory storage medium of claim 12, further comprising instructions that if executed enable a computing system to:

set the radio timer for a schedule end time based on a schedule end parameter from the radio control schedule;

receive notification that the radio timer is at the schedule end time; and send an enable radio control command to enable the radio processor.

15. The non-transitory storage medium of claim 14, further comprising instructions that if executed enable a computing system to:

receive the enable radio control command by an applications processor; and send an enable radio control signal from the applications processor to the radio processor.

* * * * *